Figure 1:
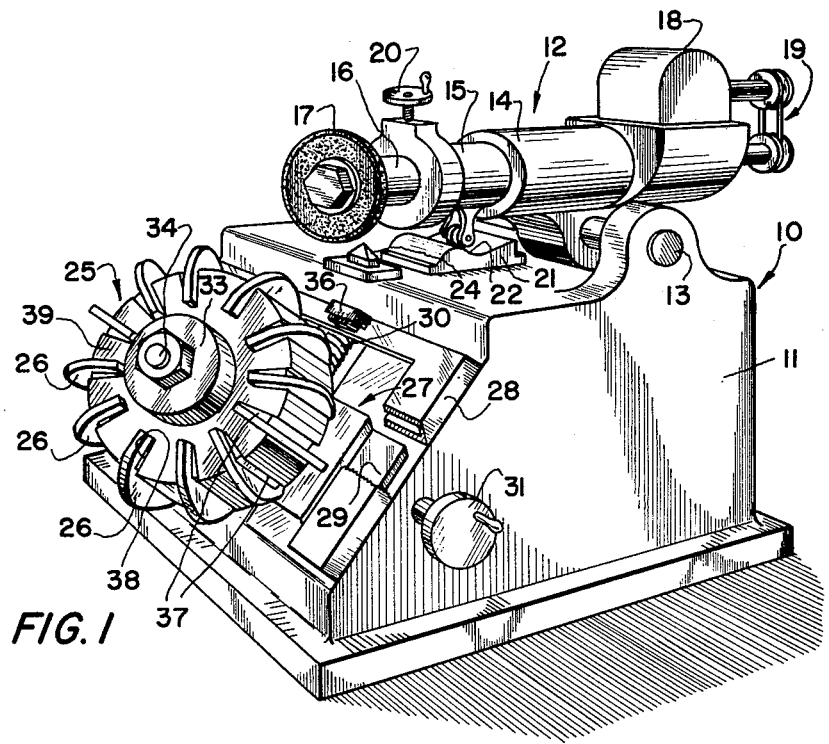

Dec. 29, 1964 A. W. CRONIN ETAL 3,162,987
METHOD OF RESHARPENING CUTTER BLADES HAVING
A CONTOURED CUTTING EDGE
Filed Nov. 2, 1962 2 Sheets-Sheet 1

INVENTORS
ALBERT W. CRONIN
TRUMAN R. McDONALD
BY
ATTORNEY

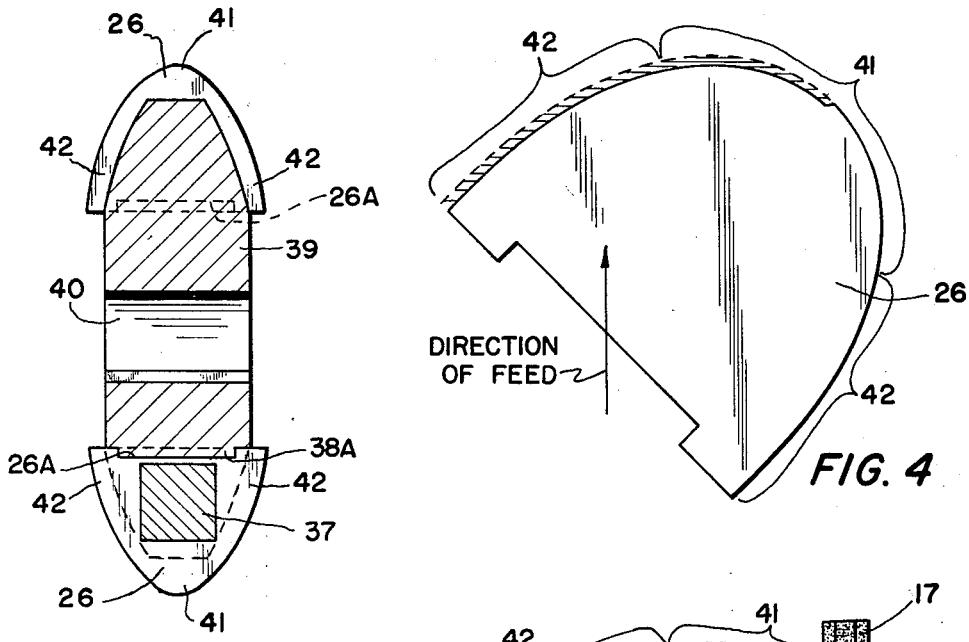
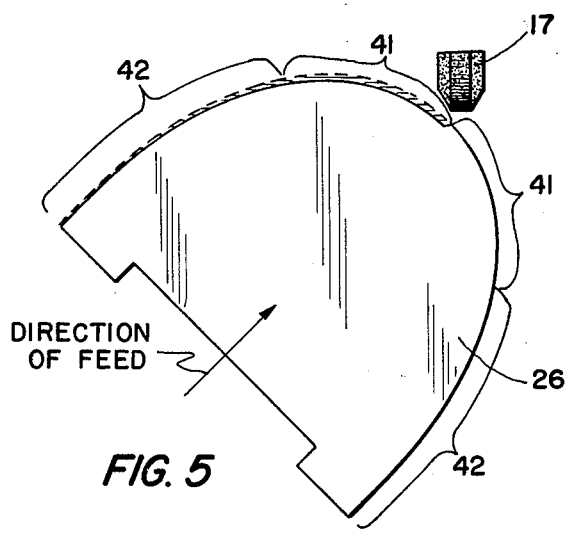
FIG. 3
FIG. 4
FIG. 5
INVENTORS
ALBERT W. CRONIN
TRUMAN R. McDONALD
BY *Arthur Frederick*
ATTORNEY 中
United States Patent Office 3,162,987
Patented Dec. 29, 1964

3,162,987
METHOD OF RESHARPENING CUTTER BLADES HAVING A CONTOURED CUTTING EDGE
Albert W. Cronin, Corning, and Truman R. McDonald, Campbell, N.Y., assignors to Ingersoll-Rand Company, New York, N.Y., a corporation of New Jersey
Filed Nov. 2, 1962, Ser. No. 234,930
4 Claims. (Cl. 51—288)

This invention relates to automatic grinding devices, and more particularly to a method of resharpening milling cutter blades and a work feeding mechanism for an automatic grinding device to sharpen the cutter blades of a contoured milling cutter, such as of the Holroyd type, which is employed to machine helical grooves of parabolic configuration in a cylindrical piece of stock.

Heretofore, automatic cutter grinding machines have employed work feeding mechanisms which held the blades with the longitudinal axes thereof extending at an angle with respect to a line projecting normal to the mean path of reciprocatiaon of the grinding wheel and fed the blades to the grinding wheel substantially normal to the mean path of linear reciprocation of the grinding wheel. Such machines have been found unsatisfactory for the sharpening of the cutter blades of a contoured milling cutter such as of the Holroyd type, wherein the blades have a cutting edge of substantially parabolic or elliptical form since the machines effected removal of the same amount of cutter blade material from the sides and top of the cutter blades. In other words, in order to grind a new cutting edge along the entire parabolic contour of a blade by use of the conventional automatic cutter grinding machines, more material was removed from the sides of the blade than was necessary to restore the cutting edge at the sides of the blade. This grinding machine and method seriously reduced the number of times a cutter blade could be sharpened before it had to be discarded. In addition, such automatic cutter grinding machines required a grinding wheel of excessively large size in relation to the size of the cutter blade; as for example, a blade of seven inches in length would require a grinding wheel of about twenty inches or more in diameter so that the grinding surface of the grinding wheel would properly engage the blade to be sharpened. Because of the aforementioned disadvantages of conventional automatic cutter grinding machines, the blades of contoured milling cutters, such as of the Holroyd type, have been sharpened by first removing the blade from milling cutter and setting the blade in a machine which is manually operated. Not only had the machine to be operated by a highly skilled operator, but such sharpening method was very time consuming.

From the foregoing, it can be seen that it is essential in resharpening cutter blades having a parabolic or elliptical cutting edge to maintain removal of blade material from the sides to a minimum in order to insure the maintenance of the required cutter blade width through as many resharpenings as possible.

It, therefore, is an object of the present invention to provide a method of resharpening a cutter blade wherein the cutter is fed toward a grinding wheel in a direction at an angle with respect to the mean path of linear reciprocation of the grinding wheel to achieve resharpening of a cutter blade having a substantially parabolic or elliptical cutting edge with minimum removal of cutter blade material from the sides of the cutter blade.

It is a further object of this invention to provide a method of resharpening a cutter blade wherein the cutter is fed toward a grinding wheel in a direction in relation to the mean path of linear reciprocation of the grinding wheel so that the resharpening of the substantially parabolic formed cutter blades may be achieved by a relatively unskilled operator more quickly than present methods of resharpening such cutter blades.

A feature of the present invention is the provision of a work or cutter feeding mechanism arranged angularly with respect to the mean path of linear reciprocation of a grinding wheel so that the cutter blade having a substantially parabolic cutting edge is delivered into intermittent engagement with the grinding wheel cutting surface substantially normal to the latter to effect resharpening with minimum removal of cutter material at the sides of the blade.

Accordingly, the present invention contemplates an improved automatic grinding machine comprising a grinding wheel assembly suitably mounted on a frame or base for simultaneous rotation about its axis, and reciprocation along its axis of rotation, in combination with a feed mechanism for cutter blades having a substantially parabolic shaped cutting edge. The grinding wheel is also pivotally mounted for movement in vertical planes as it reciprocates.

The feed mechanism comprises a base having guide means or slideways thereon and a cutter blade support means adapted to engage the guide means for slidable movement relative to the latter. The guide means is provided with means for holding the cutter blade to be ground with the longitudinal axis of the blade extending parallel to the guide means and the plane of the blade disposed substantially normal to the plane of the grinding wheel. The guide means is disposed to extend at an acute angle with respect to a line projecting normal to the mean path of reciprocation of the grinding wheel, preferably between about 30° and about 50°, so that the cutter blade is carried by the support means into intermittent engagement with the cutting face of the grinding wheel as the cutter blade is fed in a direction substantially normal to the grinding wheel cutting face whereby minimum removal of cutter blade material is achieved from the sides of the cutter blade to effect resharpening of the blade.

Figure 2:
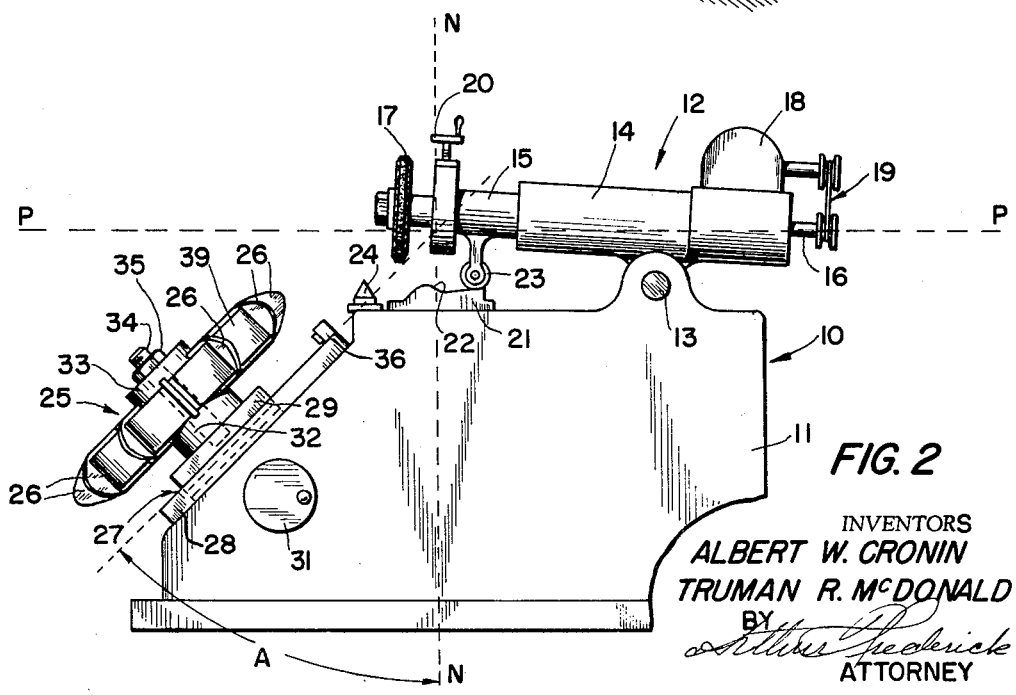

The invention will be more fully understood from the following description when considered in connection with the accompanying drawings in which:

FIG. 1 is a view in perspective of a grinding machine according to this invention, FIG. 2 is a view in side elevation of the grinding machine shown in FIG. 1, FIG. 3 is a sectional view of a milling cutter of the Holroyd type showing the cutter blades having a cutting edge of substantially parabolic shape, FIG. 4 is a schematic illustration showing the grinding effect on a contoured blade which is fed in a vertical direction or normal to the mean path of reciprocation of the grinding wheel, and FIG. 5 is a schematic illustration showing the grinding effect on a contoured blade which is fed by the feeding mechanism according to this invention.

Now referring to the drawings, the reference numeral 10 generally designates an automatic cutter grinding machine according to this invention having a base or frame 11. A grinding wheel assembly 12 is pivotally mounted at 13 to the top of frame 11. The grinding wheel assembly 12 comprises a housing 14 in which a slide 15 is mounted for reciprocation. Rotatively supported by slide 15 is a spindle 16 to which is secured a grinding wheel 17. Mounted upon housing 14 is a motor 18, as for example an electric motor, which may be connected through a pulley and belt drive 19 to spindle 16 to rotatively drive the latter and, in turn, effect rotation of grinding wheel 17. The reciprocation of slide 15 may be accomplished by mechanical, hydraulic, or pneumatic motor means, not shown, as is well known to those skilled in the art. A hand wheel 20 is provided for adjusting the position of spindle 16 with respect to slide 15. A stylus or guide cam 21, having a contoured camming surface 22 shaped to provide the grinding wheel with a path of movement conforming to the contour of a blade to be sharpened, is mounted on the frame 11. A cam follower 23 is secured to slide 15 so that as slide 15 reciprocates and cam follower 23 rides on the camming surface 22 the grinding wheel assembly is tilted about the pivot 13 to thereby move grinding wheel 17 in a path conforming to the contour of the blade to be sharpened. A diamond "dressing stone" 24 is secured to the top of frame 11 and is so positioned that on each stroke of the grinding wheel its peripheral grinding surface is "dressed."

The grinding wheel assembly 12, hereinabove described, including the means for reciprocating slide 15 and rotating the grinding wheel 17, may be of any well-known construction, such as shown in the U.S. Patents No. 2,055,361, No. 3,005,296, No. 3,009,294, and No. 3,081,253. Furthermore, it is not essential to the present invention that the means, including the hand wheel 20, for longitudinally adjusting spindle 16 relative to slide 15 be of the construction as shown in FIGS. 1 and 2, but the entire grinding wheel assembly may be constructed as shown in U.S. Patent No. 3,081,253.

To properly feed a milling cutter 25 having contoured blades 26 to be sharpened, such as a milling cutter of the Holroyd type, into engagement with grinding wheel 17, a feed mechanism 27 according to this invention is provided. As shown in FIGS. 1 and 2, feed mechanism 27 comprises a slideway 28 supported on frame 11 at an acute angle A from line N—N projecting normal to the mean path of reciprocation P—P of slide 15 and grinding wheel 17. For grinding a cutter blade 26, having a parabolic peripheral configuration, it has been found preferable to mount slideway 28 at an angle of between approximately 30° and approximately 50° from line N—N projecting normal to the mean path of reciprocation P—P, the precise angle being determined by the particular parabolic curvature of the blade to be sharpened.

A slide 29 is slidably receivable in slideway 28 and is moved relative to slideway 28 by any of several means well known to those skilled in the machine tool art, such as by a rotatably driven feed screw 30. A hand wheel 31 may be suitably mounted to engage and disengage feed screw 30 so that the position of slide 29 in slideway 28 may be manually adjusted when hand wheel 31 is engaged with feed screw 30 to rotate the latter.

Milling cutter 25 is secured to slide 29 by a clamping means comprising a spacer block 32 and a holding plate 33, the spacer block 32 being disposed between and in abutment against the juxtaposed surfaces of the milling cutter and slide 29 while the holding plate 33 abuts the surface of the milling cutter opposite from the spacer block 32. A stud 34 is secured to extend through registered holes in holding plate 33, milling cutter 25, spacer block 32. The upper or distal end portion of stud 34 is threaded to receive a nut 35 which nut, when turned on the threaded end portion of stud 34, draws the holding plate 33, milling cutter 25, spacer block 32 and slide 29 together in tight abutment so that the axis of the milling cutter is perpendicular to slideway 28 and the plane of the milling cutter and the longitudinal axes of the blades 26 to be ground lie parallel with the angular position A of slideway 28. Thus, a blade 26 to be sharpened is supported and moved by the feed mechanism 27 into intermittent engagement with the grinding wheel 17 at an angle coincident with the angle A between the slideway 28 and a line N—N projecting normal to the mean path of reciprocation P—P of grinding wheel 17. This angularity of the feed of blade 26 insures that the ground contour will be symmetrical on opposite sides of the blade from the longitudinal axis thereof as well as effecting removal of cutter blade material at the desired portions of the cutter edge.

A limit switch 36 is mounted at the upper end of slideway 28 to cause the motors to cease operation when the slide 29 engages and actuates the switch at the limit of travel of slide 29. By reversing rotation of feed screw 30, slide 29 and milling cutter 25 are moved away from grinding wheel 17 so that another grinding pass may be accomplished if necessary.

As previously mentioned and illustrated in FIGS. 1 and 2, the above described automatic cutter grinding machine 10 has particular application to sharpening the blades of a Holroyd type milling cutter. The milling cutter 25 comprises a plurality of radially arranged blades 26 which are secured by wedges 37 in slots 38 formed in the body 39 with the parabolic cutting edge projecting beyond the periphery of body 39. To laterally position the blades in their respective slots 38, each of the blades may be provided with a groove 26A in the base edge of the blade, which groove receives a tongue 38A formed in the bottom of slot 38. The body 39 is provided with a central opening 40 by which the body is secured to a rotatively driven shaft (not shown) of a milling machine (not shown) when the cutter is being employed to machine a helical groove of parabolic configuration in a cylindrical piece of stock. As can be readily visualized, blades 26 during the machining operation will incur substantially greater wear at the top portion 41 of the blade than at the side portions 42 thereof and, therefore, less removal of blade material at the side portions 42 of the blades is necessary than at the top portions 41 to restore the cutting edge along the entire peripheral cutting edge of the blades. It is believed also readily apparent that since the cutter blade as it is worn may be repositioned radially outwardly from body 39, the less blade material removed from the side portions 42, as compared with the top portions 41, the longer will be the operative life of blades 26.

As schematically illustrated in FIG. 5, the feed mechanism and its cooperative relationship to grinding wheel assembly 12 according to this invention achieves blade grinding wherein only that amount of blade material that is necessary to restore the cutting edge of the blade along the sides 42 thereof is removed from the blade. While more blade material may be removed from the top 41 of the blade than may be necessary to restore the cutting edge, or as compared with that removed in prior art devices as represented by the cross hatched area in FIG. 5, such removal is not critical and does not have more than a negligible adverse effect upon the length of operative life of blade 26. This grinding effect is readily distinguishable from prior art devices having a vertical feed by viewing FIG. 4 wherein blade material removed from the top and sides of the blade is substantially the same, blade material removed being represented by the cross hatched area.

In operation of the automatic cutter grinding machine 10, the milling cutter 25 having blades 26 to be sharpened is positioned on spacer block 32 with stud 34 passing through opening 40 of the milling cutter. Holding plate 33 is then positioned against body 39 of milling cutter 25 with stud 34 projecting through the opening (not shown) in holding plate 33. The milling cutter 25 is positioned with a blade 26 to be ground disposed so that the plane of the blade is perpendicular to the face of grinding wheel 17. The nut 35 is then turned upon the threaded end portion of stud 34 to secure holding plate 33, milling cutter 25, spacer block 32, and slide 29 in tight, fixed relationship to each other. The milling cutter 25 is then manually moved by hand wheel 31 upward on the slide 29 by means of feed screw 30 until the first blade to be ground intersects the path of grinding wheel 17. Milling cutter 25 is then set to automatic feed by conventional means (not shown) and the grinding cycle begins. A switch, not shown, is closed to cause operation of the motor means including motor 18 for simultaneously effecting rotation and reciprocation of grinding wheel assembly 12. This switch may also effect operation of the motor drive means (not shown) for rotating feed screw 30. As grinding wheel 17 is reciprocated, cam follower 23 rides upon camming surface 22 of guide cam 21 so that grinding wheel 17 follows a path substantially corresponding to the parabolic curvature of one half of the peripheral cutting edge of blade 26. After slide 29 engages and actuates limit switch 36, reciprocation of grinding wheel assembly 12 ceases and slide 29 and the milling cutter attached thereto are automatically or manually returned to the initial starting position on slideway 28 as shown in FIGS. 1 and 2. Another grinding operation may then be followed, if such is necessary, to restore the cutting edge.

After the blade edge is sharpened, nut 35 on the threaded end portion of stud 34 may be loosened and milling cutter 25 rotatively indexed to the next adjacent blade to be sharpened. After the other blade is properly positioned with respect to grinding wheel 17, nut 35 is retightened to firmly secure the milling cutter in this new position. The machine is agan operated as previously described to grind the cutting edge of the blade. The foregoing operative procedure is followed for each of the blades to be sharpened. After the last blade has been sharpened, the nut is removed from stud 34, including holding plate 33, and milling cutter 25 is removed, turned over, and replaced over stud 34. Holding plate 33 is then replaced on stud 34 and nut 35 retightened on stud 34 after the blade to be sharpened is properly positioned with respect to grinding wheel 17 by rotative adjustment of the milling cutter as previously described. Thereafter milling cutter grinding machine 10 is operated in the manner above described to grind the other half of the cutting edge of each of the blades. After the entire cutting edge of each of the blades has been resharpened, the milling cutter 25 is removed and is then ready for remounting on a milling machine (not shown).

It is believed now readily apparent that the present invention provides a method of and apparatus for resharpening milling cutter blades having a cutting surface of substantially parabolic configuration which resharpening is achieved relatively quickly and accurately, and at the same time without impairing the maximum operative life of the blades.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

We claim:

1. A method of resharpening a cutter blade having a substantially parabolic shaped cutting edge and a longitudinal axis comprising the steps of
   (a) reciprocating and simultaneously rotating a grinding wheel and
   (b) feeding the cutting blade with the longitudinal axis of the blade at an acute angle with respect to a line projecting normal to the mean path of reciprocation of the grinding wheel so that the blade intermittently engages the cutting face of the grinding wheel substantially normal to the latter as the grinding wheel reciprocates.

2. The method of claim 1 wherein the acute feeding angle of the cutting blade is between about 30° and about 50°.

3. A method of sharpening a cutter blade having a substantially parabolic shaped cutting edge and a longitudinal axis comprising the steps of
   (a) reciprocating a rotating grinding wheel in a path substantially complementary to the contour of half the cutter blade edge to be sharpened,
   (b) positioning the cutting blade with the longitudinal axis of the blade at an acute angle with respect to a line projecting normal to the mean path of reciprocation of the grinding wheel, and
   (c) feeding the blade along the longitudinal axis of the blade so that the blade intermittently engages the cutting face of the grinding wheel substantially normal to the latter as the grinding wheel reciprocates.

4. The method of claim 3 wherein the acute feeding angle of the cutting blade is between about 30° and about 50°.

References Cited by the Examiner
UNITED STATES PATENTS

| | | | |
|---|---|---|---|
| 1,931,684 | 10/33 | Aker | 51—288 |
| 2,055,361 | 9/36 | Oliver | 51—100 |
| 2,057,303 | 10/36 | Gstyr | 51—288 |
| 3,009,294 | 11/61 | Lindem et al. | 51—100 |

FOREIGN PATENTS

| | | |
|---|---|---|
| 174,728 | 2/22 | Great Britain. |

LESTER M. SWINGLE, *Primary Examiner.*